Patented Mar. 16, 1954

2,672,478

UNITED STATES PATENT OFFICE 2,672,478

ESTERS OF CERTAIN UNSATURATED ALCOHOLS AND CERTAIN ALKYLIDENE BISPHENOXY FATTY ACIDS

John B. Rust, East Hanover, and William B. Canfield, Montclair, N. J., assignors, by direct and mesne assignments, of one-half to Montclair Research Corporation, Montclair, N. J., a corporation of New Jersey, and one-half to Ellis-Foster Company, a corporation of New Jersey No Drawing. Application December 9, 1949, Serial No. 132,208

5 Claims. (Cl. 260—473)

This invention relates to esters, and intermediates therefor, and more particularly to aryloxy fatty acid esters, particularly of unsaturated aliphatic alcohols more specifically beta unsaturated aliphatic alcohols having from 3 to 4 carbon atoms, and intermediates therefor, to products produced with such esters, to copolymers containing such esters and products, and to methods of making such esters, products, intermediates, polymers and copolymers, and their utilization.

Among the objects of this invention is the production of aryloxy fatty acid esters capable of utilization in obtaining resinous reaction products of light color, high viscosity, low acid number, and color-stable, convertible to insoluble, infusible masses possessing good resistance as to the action of aqueous alkalis.

Other objects of the invention include intermediates for producing such esters.

Further objects include polymers and copolymers containing such esters.

Further objects include methods of producing such esters, intermediates, polymers and copolymers.

Still further objects will appear from the more detailed description set forth below it being understood that such more detailed description is given by way of illustration and explanation only, and not by way of limitation, since various changes therein may be made by those skilled in the art without departing from the scope, and spirit of the present invention.

In accordance with the present invention, an aryloxy fatty acid ester is produced having the following formula

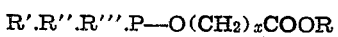

in which P is an aromatic hydrocarbon radical, R is a beta unsaturated aliphatic radical having from 3 to 4 carbon atoms, $x$ is from 1 to 17 so that $-(CH_2)_xCOO-$ represents an acyloxy group derived from a fatty acid of from 2 to 18 carbon atoms, R' is a beta unsaturated aliphatic radical of from 3 to 4 carbon atoms or $-O(CH_2)_xCOOR$ as defined above, R'' is hydrogen, alkyl, or R' and R''' is hydrogen, alkyl, or a beta unsaturated aliphatic radical of from 3 to 4 carbon atoms. Hydrogens remaining in the aromatic hydrocarbon radical and in the acyloxy group may be substituted by other groups both functional and non-functional so long as they do not interfere with the desired products and their production or their utilization.

While a variety of esters may be produced having the formulations set forth above, there are two particularly important groups of such esters emphasized under the present invention. The first such group include such esters having the formulation

where P, R and $x$ have the meaning set forth above, R' is $-O(CH_2)_xCOOR$ as defined above, and R'' is hydrogen, alkyl, or $-O(CH_2)_xCOOR$ as defined above. The second such group of esters are those having the formulation

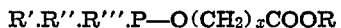

where P, R, and $x$ have the meaning set forth above, R' is a beta unsaturated aliphatic radical having from 3 to 4 carbon atoms, and R'' and R''' are selected from hydrogen, alkyl and R'. These two groups of esters are of outstanding importance.

In any of the formulations set forth above, the aromatic hydrocarbon radical P may be selected from polyvalent mononuclear or poly nuclear radicals such as o-, m-, or p-phenylene, methylphenylene, dimethylphenylene, naphthylene, diphenylene, alkylene - bis - phenylene (e. g., methylene - bis - phenylene, isopropylidene-bis - phenylene, methyl - ethylmethylene - bisphenylene, cyclohexylidene - bis - phenylene, methyl - isobutylmethylene - bis - phenylene, etc.), or a trivalent benzene or naphthalene radical; R and other groups specified as unsaturated aliphatic radicals of 3 to 4 carbon atoms will preferably be selected from allyl, methallyl crotyl, butenyl, where one or more of these groups are present, and the same or different such allyl-type groups may be present in the same molecule. The allyl groups are preferred and will be utilized below to illustrate the invention. $x$ has been set forth as from 1 to 17 to cover fatty acids of from 2 to 18 carbon atoms including straight and branched chains. Desirably lower fatty acids are utilized such as from 2 to 4 carbon atoms, while for best purposes the acid will be derived from acetic, so that $x=2$ will be used to illustrate the invention set forth herein.

Where alkyl substituents are referred to above in the formulations, they may be any alkyl groups, though most desirably they have less than 8 carbon atoms and preferably less than 4.

To illustrate esters of specific formula as exemplary of the invention, and illustrative, not restrictive thereof, the following are noted: the diallyl ester of diphenyl-olpropane diacetic acid (diallyl isopropylidene-bis-phenoxyacetate) having the formula

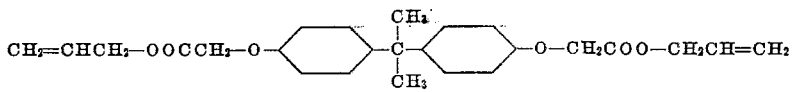

diallyl ester of resorcinol diacetic acid (diallyl m-phenylene oxyacetate), and the corresponding dimethallyl, dicrotyl, and dibutenyl derivatives. Also, allyl ester of allyl-phenoxyacetic acid, allyl ester of diallyl phenoxy-acetic acid, allyl ester of triallyl phenoxyacetic acid, and the corresponding methallyl, crotyl and butenyl esters of monoallyl-, diallyl-, and triallyl phenoxyacetic acid, the allyl ester of methallyl-, crotyl-, butenyl-phenoxyacetic acid, of dimethallyl and trimethallyl phenoxyacetic acids, etc.

The first group of esters having the formula R'.R''.P—O(CH₂)ₓCOOR as set forth above, may be generally stated to be unsaturated phenolic compounds, in general high-boiling pale yellow liquids characterized by the common grouping of an oxygen atom attached to an aromatic ring and to a beta-unsaturated monohydric alcohol ester of an aliphatic monocarboxylic acid. They tend to set up to hard, brittle, resinous masses when heated at 150°–200° C. Such polymeric products may therefore be formed without use of peroxides or acidic catalysts. When thickened to a syrup and baked in the form of thin films, hard brittle masses are formed which are exceedingly alkali-resistant. When these unsaturated phenolic compounds are polymerized by themselves in the presence of heat, characteristic red to dark brown color-bodies are formed which give rise to the production of characteristically dark products. Modified products of light color and unique properties are referred to below.

The second group of esters having the formula R''.R'''.R''''.P—O(CH₂)ₓCOOR as set forth above, may be generally defined as high boiling liquids in a substantially pure state, as they are capable of being distilled under reduced pressure without undue polymerization. They appear to be slow to polymerize in the presence of peroxides or metallic driers. However, high temperatures particularly in the presence of minute quantities of mineral acids such as hydrogen chloride, sulphuric acid, phosphoric acid, paratoluene sulphonic acid, and the like, or such anhydrous salts as stannic chloride, aluminum chloride, boron trifluoride, and the like, readily convert them into infusible, insoluble masses which are highly resistant to the action of aqueous alkalis. When these unsaturated phenolic compounds are polymerized in the presence of the above mentioned catalysts, characteristic red to dark brown color-bodies are formed which give rise to the production of characteristically dark products.

Either of the groups of esters referred to above may be combined with rosin or rosin-containing esters, particularly a polyhydric alcohol ester, a rosin modified alkyd resin, a mixture of rosin and a polyhydric alcohol (e. g. glycerol, pentaerythritol, etc.) in stoichiometric or other proportions to form a rosin ester, a mixture of rosin, polyhydric alcohol and a polycarboxylic acid (e. g. phthalic, succinic, adipic, sebacic, etc.) in stoichiometric or other proportions to form a rosin-modified alkyd resin. Or either of the groups of esters referred to above may be combined with drying oil materials including a drying oil (raw or bodied) or a polyhydric alcohol ester of drying oil acids other than the glycerol ester; drying oil acids which may be individual unsaturated acids or the mixed acids resulting from saponifying a drying oil; a drying oil-modified alkyd resin; a stoichiometric mixture of drying oil acids and polyhydric alcohol, e. g. glycerol, pentaerythritol, etc. to form an ester during the heating process; or a stoichiometric mixture of drying oil acids, polyhydric alcohol and polycarboxylic acid, e. g., phthalic, succinic, adipic, sebacic, etc., to form an alkyd resin during the heating process. Any of these rosin etc. and drying oil, etc. modified esters of either type as set forth above give light colored highly viscous color-stable products of low acid number that are particularly valuable in the production of coating compositions and for many other purposes.

Either of the types of esters referred to above, namely esters of the type

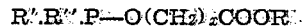

or R'.R''.R'''.P—O(CH₂)ₓCOOR where P, R', R'', R''', and x have the values set forth above, may be produced from an aliphatic alcohol where the aliphatic group is a beta unsaturated aliphatic radical having from 3 to 4 carbon atoms, under any desired conditions suitable for preparation of esters as for example by heating at a temperature not generally above that of refluxing, in the presence of an esterification catalyst, and desirably in the presence of an inhibitor of polymerization of the unsaturated alcohol. Desirably the reaction is carried out in the presence of an azeotrope former with water, one which desirably does not interfere with the desired esterification reaction. As esterification catalysts, those usually employed may be utilized such as concentrated sulphuric acid, toluene sulfonic acid, naphthalene sulfonic acid, etc. As the polymerization inhibitor there may be employed copper, and amine and phenolic type inhibitors such as tertiary butyl catechol, m-phenylene diamine, hydroquinone, etc. As azeotrope formers for removal of water there may be used any desired liquid organic solvent forming azeotropes with water at the temperatures employed for reaction, such as the lower aromatic hydrocarbons, e. g., benzene, the several xylenes, etc.

In the abovementioned processes, the phenoxy or other aryloxy derivative of a fatty acid may be prepared in any desired manner. Thus, a monochlor substituted fatty acid of from 2 to 18 carbon atoms may be heated to a temperature not exceeding refluxing with an alkylene diphenol in an aqueous alkaline solution. These and other methods will be illustrated below.

As an example of preparing esters of the first type as set forth herein, the following example is given, to illustrate the preparation of diphenylolpropane dioxyacetic acid and its diallyl ester, it being understood that other diarylolalkane dioxy-fatty acids and esters thereof with beta unsaturated aliphatic alcohols of from 3 to 4 carbon atoms may be prepared, as well as intermediates therefore:

I 228 parts of diphenylol propane
80 parts of sodium hydroxide
160 parts of water were warmed together to form a clear solution B (parts are by weight here and below unless otherwise indicated).

180 parts alpha chloracetic acid
106 parts sodium carbonate
500 parts water were warmed together to form a clear solution A. A and B were mixed and heated under reflux for 3 hours. The reaction product was neutralized with carbon dioxide and acidified to produce the acid

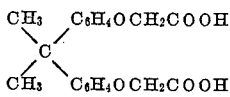

which was filtered, washed with water, and dried. Such diphenylol propane dioxyacetic acid was then esterified as follows:

200 parts diphenylolpropane dioxyacetic acid
150 parts allyl alcohol
300 parts benzene
3.5 parts p-toluene sulfonic acid
3.5 parts copper powder were refluxed together to remove azeotropically all water of esterification. The resulting product was neutralized with a saturated sodium carbonate solution, washed with water and finally dried over anhydrous sodium sulphate. After removal of benzene at 75° C. (20 mm. pressure) a pale yellow liquid ester was obtained of acid No. 6.2.

Or in the case of the allyl or related phenol derivatives, the phenol may be treated with a chlor fatty acid and esterifying the unsaturated aryloxy fatty acid thus formed with an unsaturated aliphatic alcohol (desirably monohydric) having from 3 to 4 carbon atoms (e. g. allyl, methallyl, crotyl, butenyl). Such derivatives are illustrated by the preparation of allyl diallylphenoxy-acetate as follows:

II

One hundred parts (0.575 mole) of diallyl phenol are dissolved in a solution of 23 parts of sodium hydroxide in 200 parts of water to form a clear solution of diallyl sodium phenate; a solution of 54.4 parts of chloroacetic acid dissolved in 125 parts of water was mixed with a solution of 30.5 parts of sodium carbonate in 125 parts of water to form sodium chloroacetate. The aqueous solution of sodium chloroacetate and the aqueous solution of sodium diallylphenate were refluxed together at 90°–100° C. for 3 hours. The resulting aqueous solution was neutralized by bubbling carbon dioxide into the reaction product and then acidified with 10% aqueous hydrochloric acid. The resulting white powder was filtered, washed free of mineral acid, and dried. A yield of 92.6 parts of diallyl phenoxyacetic acid was obtained. A mixture of 85 parts of diallyl phenoxyacetic acid, 100 parts of allyl alcohol, 200 parts of benzene, 1.8 parts powdered copper, and 1.8 parts of p-toluene sulfonic acid were refluxed together while azeotropically removing the water of esterification. The resulting ester was washed, first with a saturated sodium carbonate solution, and then with water, and finally dried over anhydrous calcium chloride. The benzene solvent was removed under vacuum at 90°–100° C. The preparation of allyl phenoxyacetic acid and its allyl ester is illustrated below:

II-B 134 parts of allyl phenol, 40 parts of sodium hydroxide, and 150 parts of water were mixed together to form a clear aqueous solution. 94.5 parts of alpha chloroacetic acid dissolved in 150 parts of water and 53 parts of anhydrous sodium carbonate dissolved in 150 parts of water were mixed together to form an aqueous solution of alpha sodium phenate and alpha chlorosodium acetate were mixed together and the resulting clear solution was refluxed for 3 hours. It was then neutralized with carbon dioxide and acidified to produce a crystalline acid which was washed and dried.

100 parts of the above allyl phenoxyacetic acid, 100 parts of allyl alcohol, 250 parts of benzene, 2 parts of freshly precipitated copper powder, and 2 parts of paratoluene sulphonic acid were refluxed together while azeotropically removing the water of esterification as formed. The ester was washed twice with a saturated aqueous sodium carbonate solution, and then with three 1½ liter portions of water. After drying the solution of allyl ester in benzene over anhydrous calcium chloride, the benzene was removed and the allyl ester purified by distillation.

Homopolymers of both types of esters, namely R'.R".P—O(CH₂)ₓCOOR and

R'.R".R'''.P—O(CH₂)ₓCOOR as defined above, have been referred to wherein such esters are polymerized to give rather highly colored materials. Reaction with rosin material of many different types and with drying oil material of variant character has been referred to above in the production of light colored resins of valuable utilities. Such reaction products of the stated esters with rosin material and drying oil material are exemplary of copolymerization products, particularly where the resin forming processes utilize unsaturated materials that react with the stated esters through the unsaturated groups present. The stated esters may be copolymerized with other unsaturated compounds such as vinyl type compounds, including for example styrene and substituted styrenes, acrylic acid esters, methacrylic acid esters, acrylonitrile, and other such unsaturated compounds that have been used in the art in other relations for the production of polymers and copolymers. Such combinations with styrene, acrylic acid esters, methacrylic acid esters, etc. may be secured in various ways as, for example, by reaction of the rosin-material-modified esters and the drying-oil-material-modified esters with the vinyl type compound, followed by polymerization, or by reaction between the stated esters of both types, namely R'.R".P—O(CH₂)ₓCOOR and

R'.R".R'''.P—O(CH₂)ₓCOOR as defined above, with the vinyl type compound or other copolymerizing compound, or by producing the latter types of copolymers and reacting them with the rosin material or the drying oil material.

Particularly valuable copolymers may be produced by utilizing both types of the unsaturated esters produced in accordance with the present invention with glycol maleate type reaction products. These esters include for example polyhydric alcohol esters of unsaturated polycarboxylic acids. The alcohol is illustrated by glycerol, polyglycerols, glycols such as ethylene glycol, polyethylene glycols such as "carbitol" pentaerythritol, polypentaerythritols, dihydroxy ethoxybenzene, sorzitol, mannitol, and the like. The acids are illustrated by maleic, fumaric, itaconic, citraconic, etc. Glycol maleate is used to illustrate these types of products which are now well known. Any of them may be utilized to produce copolymers with the aryloxy fatty acid esters of the present invention, in molar ratios for example of from 4:1 to 1:4, at elevated temperature of for example from about 200° C. to 300° C. The glycol maleate type esters may be modified by reaction with resin acids such as rosin, abietic acid and resin acids from the saponification of copals and other natural resins.

Further, the aryloxy fatty acid esters may be copolymerized with monoalkenyl esters of polycarboxylic acids both saturated and unsaturated such as monoallyl maleate, monoallyl itaconate, monoallyl citraconate, monoallyl phthalate, monoallyl fumarate, monoallyl succinate, monoallyl sebacate, monoallyl adipate, and the like, diallyl esters of the stated acids, and esters as just set forth in which the allyl group is replaced by methallyl, crotyl, butenyl, etc. Here again molar ratios of the reactants may be 4:1 to 1:4 and temperatures of 200 to 300° C. illustratively employed.

Furthermore aryloxy fatty acid esters may be copolymerized with both the glycol maleate type esters and the allyl type esters as set forth above utilizing the stated esters in their preformed state or by reacting the components necessary, simultaneously with the aryloxy fatty acid esters as explained above in producing the alkyd type resin copolymers. Temperatures as for example of from 200 to 300° C. commonly used in such reactions may be employed. The ratios may vary widely as for example aryloxy fatty esters to combined amounts of glycol maleate type ester and allyl type ester of from 4:1 to 1:4 in which the molar ratio of glycol maleate type ester to allyl type ester may be from 9:1 to 1:9.

Examples illustrating the production of such copolymers are given below, the parts being by weight unless otherwise indicated.

III 150 parts of raw linseed oil and 15 parts of the allyl ester of allylphenoxyacetic acid are heated together in a one-liter, 3-neck flask equipped with a stirrer, thermometer, and water-cooled condenser to 250° C. The resulting clear reaction mixture is heated finally at 260° C.–270° C. for 6 hours. A light-colored clear oil is secured which possesses a Gardner viscosity of E and an acid number of 9. A film of the oil containing 0.015% cobalt as cobalt naphthenate is baked for ½ hour at 160° C. The baked film is hard, somewhat wrinkled and non-yellowing.

IV 150 parts of raw linseed oil and 60 parts of the allyl ester of allylphenoxyacetic acid are heated together in a one liter, 3-neck flask equipped with a stirrer, thermometer, and water-cooled condenser to 250° C. The resulting clear reaction mixture is heated finally at 260°–270° C. for 4¼ hours. A light-colored, clear oil is obtained which has a Gardner viscosity of H.

50 parts of ester gum and 80 parts of the oil of Example 8 are heated together to 280° C. in ½ hour. Heating is thereafter continued at 280° C.–290° C. for 70 minutes. The resulting varnish base could be drawn into a string 24 inches in length. The light-colored varnish base is thinned with V. M. and P. naphtha to 50% solids. The Gardner viscosity is F.

To 50 parts of the above varnish is added 0.015% cobalt as cobalt naphthenate based upon the oil content of the varnish. A film of the varnish (baked for 1 hour at 120° C.) is non-yellowing. It possesses a Sward Rocker hardness of 55 and turns white in 1% aqueous alkali after 45 minutes' immersion.

To 50 parts of the above varnish is added 0.6% lead and 0.06% cobalt as naphthenates based upon the oil content of the varnish. The varnish air dries to a tack-free film in 4 hours. The dried film possesses a Sward hardness of 57 after 24 hours and 57 after 96 hours.

V 150 parts of raw soya bean oil and 45 parts of the allyl ester of diallylphenoxyacetic acid are heated together in a one liter, 3-neck flask equipped with a water-cooled condenser, stirrer, and thermometer to 250° C. for 5 hours. A light-colored clear oil is obtained, having a Gardner viscosity of F, and an acid number of 10.2. A film of the oil containing 0.015% cobalt as cobalt naphthenate is baked for 1 hour at 120° C. The resulting film is non-yellowing, and possesses a Sward Rocker hardness of 41. The baked film clouds somewhat after immersion in 1% aqueous alkali for 1 hour.

The ester gum varnishes from the oil examples were carefully compared with a like varnish from ester gum and bodied linseed oil "Alinco Z-2." 50 parts of ester gum and 80 parts of bodied linseed oil are heated together to 280° C. in ½ hour. The resulting varnish base is then heated further at 280° C.–290° C. for 110 minutes. The resulting varnish base could be drawn into a string 24 inches in length. The varnish base when thinned to 50% solids with V. M. and P. naphtha has a Gardner viscosity of D. To 50 parts of the above varnish is added 0.015% cobalt as cobalt naphthenate based upon the oil content of the varnish. A film of the varnish is baked for one hour at 120° C. and darkened decidedly. It possesses a Sward Rocker hardness of 24 and turns white in 1% aqueous alkali after 15 minutes of immersion. To 50 parts of the above varnish is added 0.6% lead and 0.06% cobalt as naphthenates based upon the oil content of the varnish. The varnish air dries to a tack-free film in 7½ hours. The dried film possesses a Sward hardness of 27 after 24 hours and 47 after 96 hours.

The following table is presented to show differences between varnishes prepared from "Alinco Z-2" bodied linseed oil and the varnishes prepared from Examples 2, 3 and 6:

|  | Varnishes | | | |
|---|---|---|---|---|
|  | "Alinco" Z-2 oil | 2 | 3 | 6 |
| Cooking time at 280° C.–290° C. (min.) | 110 | 70 | 60 | 70 |
| Gardner viscosity (50% solids) | D | E | F | F |
| Drying time (tack free) | 7½ | 4¼ hrs | 5 hrs | 4 |
| Sward hardness (24 hrs.) | 27 | 33 | 29 | 57 |
| Sward Hardness (96 hrs.) | 47 | 47 | 44 | 57 |
| Color of baked film | yellowed | non-yellowing | non-yellowing | non-yellowing |
| Sward Hardness of baked film | 24 | 41 | 39 | 55 |
| Resistance of baked film to 1% aqueous alkali | white in 15 min | white in 25 min | white in 35 min | white in 45 min |

VI

One hundred parts of an alkyd resin of acid number 30 (formed by heating a mixture of 148 parts phthalic anhydride, 80 parts glycerol, 140 parts linseed oil acids and 150 parts linseed oil) and 30 parts of the allyl ester of allylphenoxyacetic acid are heated together in a 500 ml., 3-neck flask equipped with a thermometer, stirrer, and water-cooled condenser to 200° C. in one hour. Heating is thereafter continued at 200° C.–220° C. for 6 hours. A relatively viscous syrup is secured.

This reaction product is dissolved in an equal amount of xylol to form a clear solution. A film of the solution when baked for an hour at 120° C. clouded only after one hour in 1% aqueous alkali.

VII 100 parts of ester gum and 20 parts of the allyl ester of allyl phenoxy-acetic acid are heated together in a 500-mil., 3-neck flask equipped with a thermometer, stirrer, and water-cooled condenser. Heating is carried out at 200° C.–240° C. for 4 hours, and finally at 240°–250° C. for 4½ hours. The resulting resin shows an acid number of 9.8 and a ring and ball softening point of 113° C.

VIII 100 parts of ester gum and 15 parts of the allyl ester of diallyl phenoxy-acetic acid are heated together in a 5 ml., 3-neck flask equipped with a thermometer, stirrer, and water-cooled condenser. Heating is carried out at 200° C–240° C. for 4 hours and finally at 240° C.–250° C. for 6 hours. The resulting resin has an acid number of 11.3 and a ring and ball softening point of 109° C.

50 parts of the above resin and 80 parts of Z-2 bodied linseed oil are heated to 280° C. in ½ hour. Heating is thereafter continued at 280° C.–290° C. for 95 minutes. The resulting varnish base, after thinning with 130 parts of mineral spirits, possesses a viscosity (Gardner) of E. 0.010% of cobalt as cobalt naphthenate based on the drying oil content of the drier is added. The resulting varnish baked to a clear, light-colored film in ½ hour at 160° C. The baked film is unaffected after immersion in tap water for 24 hours.

IX 100 parts of glyceryl triabietate (ester gum) and 10 parts of the diallyl ester of diphenylolpropane diacetic acid are heated together in a 500 ml., 3-neck flask equipped with a thermometer, stirrer, and air-condenser. Heating is carried out at 240° C.–250° C. for 6½ hours. A light-colored clear resin is secured which possesses a ring and ball softening point of 107° C.

X 100 parts of glyceryl triabietate (ester gum) and 25 parts of the diallyl ester of diphenylolpropane diacetic acid (diallyl isopropylidene-bis-phenoxyacetate) are heated together in a 500 ml., 3-neck flask equipped with a thermometer, stirrer, and air-condenser. Heating is carried out at 250° C.–260° C. for 8 hours. A light-colored, brittle resin is obtained having a ring and ball softening point of 112° C.

50 parts of the above resin and 80 parts of Z-2 bodied linseed oil are heated together to 280° C. in ½ hour. Heating is continued at 280°–290° C. for 35 minutes. The resulting varnish base is thinned to 50% solids. 0.5% lead and 0.075% cobalt drier as naphthenates based upon the oil content of the varnish is added. The resulting varnish air-dries to a tack-free film in 4¼ hours. After 24 hours, the dried varnish film possesses a Sward Rocker hardness of 67.

XI 50 parts of pentaerythritol abietate and 5 parts of the diallyl ester of resorcinol diacetic acid are heated together in a 500 ml., 3-neck flask equipped with a thermometer, stirrer, and air-condenser. Heating is carried out at 240°–250° C. for 5½ hours. A light-colored, brittle resin is secured having a ring and ball softening point of 102° C.

XII 150 parts of raw linseed oil and 22.5 parts of the diallyl ester of resorcinol diacetic acid (diallyl m-phenyleneoxyacetate) are heated together in a one-liter, 3-neck flask equipped with a thermometer, stirrer and water-cooled condenser to 250° C. Heating is thereafter continued at 250°–260° C. for 6 hours. A light-colored, extremely viscous oil results. Acid number 8.6.

A film of the oil containing 0.6% lead and 0.06% cobalt as naphthenates air-dries to a tack-free hard coating in 24 hours.

50 parts of ester gum and 80 parts of the above oil are heated together to 280° C. in ½ hour. Heating is thereafter continued at 280° C.–290° C. for 57 minutes. The resulting varnish base may be drawn into a string 24 inches in length. The light-colored varnish base is thinned to 50% solids with V. M. and P. naphtha giving a varnish of Gardner viscosity F.

To 50 parts of the above varnish is added 0.015% cobalt as cobalt naphthenate based upon the oil content of the varnish. A film of the varnish baked for one hour at 120° C. is non-yellowing. It has a Sward Rocker hardness of 57 and turns white in 1% aqueous alkali after 1½ hours of immersion.

To 50 parts of the above varnish is added 0.6% lead and 0.06% cobalt as naphthenates based upon the oil content of the varnish. The varnish air-dries to a tack-free film in 4 hours. The dried film possesses a Sward hardness of 55 after 24 hours and 59 after 96 hours.

XIII 150 parts of raw linseed oil and 22.5 parts of the diallyl ester of the diacetic acid derivative of diphenylolpropane (diallyl isopropylidene-bis phenoxyacetate) are heated together in a one liter, 3-neck flask equipped with a thermometer, stirrer and water-cooled condenser to 250° C. Heating is thereafter continued at 250°–260° C. for 5 hours. A light-colored, extremely viscous oil is secured. Acid number 7.9.

A film of the oil containing 0.6% lead and 0.06% cobalt as naphthenates air-dried to a hard tack-free film coating in 24 hours.

50 parts of ester gum and 80 parts of the oil of Example 9 are heated together to 280° C. in ½ hour. Heating is thereafter continued at 280° C.–290° C. for 38 minutes. The resulting varnish base can be drawn into a string 24 inches in length. The light-colored varnish base when thinned to 50% solids with V. M. and P. naphtha has a Gardner viscosity of F.

To 50 parts of the above varnish is added 0.015% cobalt as cobalt naphthenate based upon the oil content of the varnish. A film of the varnish baked for one hour at 120° C. is non-yellowing. It possesses a Sward Rocker hardness of 61 and turns cloudy in 1% aqueous alkali after 1¼ hours of immersion.

To 50 parts of the above varnish is added 0.6% lead and 0.06% cobalt as naphthenates based upon the oil content of the varnish. The varnish air-dries to a tack-free film in 3½ hours. The dried film shows a Sward hardness of 57 after 24 hours and 59 after 96 hours.

The ester gum varnishes from the oil examples were carefully compared with a like varnish from ester gum and bodied linseed oil ("Alinco" Z-2).

50 parts of ester gum and 80 parts of bodied linseed oil are heated together to 280° C. in ½ hour. The resulting varnish base is then heated further at 280°–290° C. for 110 minutes and may be drawn into a string 24 inches in length. The varnish base, thinned to 50% solids with V. M. and P. naphtha, possesses a Gardner viscosity of D. To 50 parts of the above varnish is added 0.015% cobalt as cobalt naphthenate based on the oil content of the varnish. A film of the varnish when baked for one hour at 120° C. is decidedly darkened. It possesses a Sward Rocker hardness of 24 and turns white in 1% aqueous alkali after 15 minutes of immersion. To 50 parts of the above varnish is added 0.6% lead and 0.06% cobalt as naphthenates air-dry to a tack-free film in 7½ hours. The dried film above shows a Sward hardness of 27 after 24 hours and 47 after 96 hours.

The following table is presented to show differences between varnishes prepared from bodied linseed oil and the varnishes prepared from the oils disclosed in certain of the above examples:

glycol maleate (made by heating 700 parts of diethylene glycol and 588 parts of maleic anhydride together in a suitable reactor at 200–210° C. until the acid number of the resulting ester was 16.7), and 1 part of benzoyl peroxide were mixed together to form a viscous syrup. This was mixed together thoroughly with 100 parts of alpha cellulose flock in a Banbury mixer to form a moist molding composition.

Discs were molded at 300° F. and 3000 pounds per square inch for 1 minute.

Having thus set forth our invention, we claim:
1. Unsaturated esters of the formula

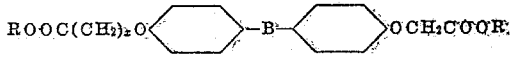

wherein B is a member of the group consisting of secondary alkylidene radicals having up to six carbon atoms and cyclohexylidene, R is a beta-unsaturated alkenyl group of 3 to 4 carbon atoms, and $x$ is 1 to 3.

2. Unsaturated esters of the formula

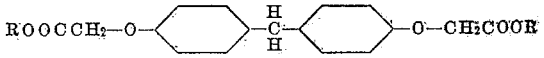

where R is a beta-unsaturated alkenyl group of 3 to 4 carbon atoms.

3. Unsaturated esters of the formula

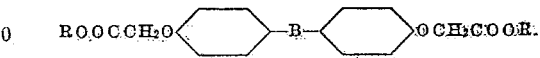

wherein B is a lower alkylidene radical, and R is a beta unsaturated alkenyl groups of 3 to 4 carbon atoms.

|  | Varnishes | | | | | |
|---|---|---|---|---|---|---|
|  | "Alinco" Z-2 oil | 1 | 2 | 3 | 8 | 9 |
| Cooking time at 280°–290° C. (min.) | 110 | 70 | 40 | 30 | 57 | 38 |
| Gardner viscosity (50% Solids) | D | D—E | F | G | F | F |
| Drying time (tack-free) | 7½ hrs | 3½ hrs | 3 hrs | 3 hrs | 4 hrs | 3½ hrs |
| Sward Hardness (24 hours) | 27 | 45 | 47 | 49 | 55 | 57 |
| Sward Hardness (96 hours) | 47 | 59 | 55 | 59 | 59 | 59 |
| *Baked Varnishes* | | | | | | |
| Color of baked film | Yellowed | Nonyellowing | Nonyellowing | Nonyellowing | Nonyellowing | Nonyellowing |
| Sward Hardness | 24 | 39 | 49 | 55 | 57 | 61 |
| Resistance to 1% aqueous alkali | White in 15 min. | White in 45 min. | White in 120 min. | White in 180 min. | White in 90 min. | White in 74 min. |

XIV 21 parts of phthalic anhydride, 29 parts of glycerol, 125.1 parts of soya bean oil acids, and 30 parts of the diallyl ether of diphenylolpropane are placed in a 500-ml., 3-neck flask equipped with a thermometer, stirrer and water-trap attached directly to a water-cooled condenser. Heating is carried out at 200°–210° C. for 6 hours. 16.2 parts of distillate are collected in the water-trap. A light-colored, hard product having an acid number of 12.2 is obtained. The modified alkyd resin is dissolved in xylol to form a clear solution of 50% solids. 0.6% lead and 0.06% cobalt as naphthenates based upon the soya bean oil acids content of the resin are added. The resin solution air-dries to a non-tacky film in 5¼ hours.

The following example illustrates the preparation of copolymers of the aryloxy fatty acid esters and diethylene glycol maleate:

XV 20 parts of the diallyl ester of diphenylol propane dioxy acetic acid, 80 parts of diethylene 4. The diallyl ester of isopropylidene di (p-phenoxyacetic acid) having the formula

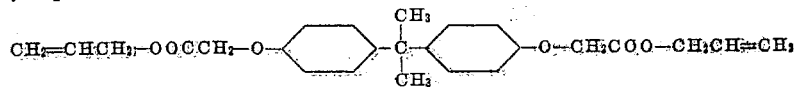

5. An ester having the formula

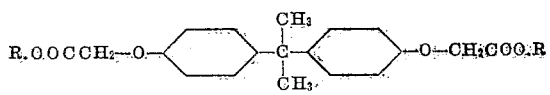

where R is a beta unsaturated aliphatic radical of from 3 to 4 carbon atoms.

JOHN B. RUST.
WILLIAM B. CANFIELD.

References Cited in the file of this patent:

UNITED STATES PATENTS

| Number | Name | Date |
|---|---|---|
| 2,449,991 | Gresham et al. | Sept. 28, 1948 |
| 2,516,611 | Berhenke et al. | July 25, 1950 |
| 2,541,003 | Day et al. | Feb. 6, 1951 |

FOREIGN PATENTS

| Number | Country | Date |
|---|---|---|
| 573,510 | Great Britain | Nov. 23, 1945 |